United States Patent Office 3,661,865
Patented May 9, 1972

3,661,865
PRODUCTION OF ABC TERPOLYMERS
Henry L. Hsieh, Bartlesville, Okla., assignor to
Phillips Petroleum Company
No Drawing. Filed May 1, 1969, Ser. No. 821,069
Int. Cl. C08g 17/003
U.S. Cl. 260—78.4
16 Claims

ABSTRACT OF THE DISCLOSURE

ABC terpolymers, which can be used as adhesives and as terminating agents for lithium initiated polymerizations, are prepared by polymerizing a mixture of an alkene oxide, a cyclic acid anhydride and a cyclic ether in the presence of an organometallic compound.

---

This invention relates to terpolymers. In another aspect, the invention relates to a method of preparing terpolymers.

It is known to one familiar with the art that one can copolymerize an acid anhydride and an alkene oxide to form a one-to-one alternating copolymer. I have now discovered that ABC terpolymers can be prepared by reacting an alkene oxide and a cyclic acid anhydride with a cyclic ether in the presence of an organometallic catalyst. The term "ABC terpolymer" as herein used designates a polymeric product in which three different types of monomers are present in the polymer molecule. These three different monomers appear in the polymer in an essentially regular repeating fashion, that is in an essentially recurring sequence such as—ABCABCABC—where A, B and C each represent a different type of monomer.

It is an object of my invention to provide an ABC terpolymer.

Another object of my invention is to provide a method for preparing such a terpolymer.

Other objects, advantages, and features of my invention will be apparent to one skilled in the art from the following disclosure and claims.

The ABC terpolymer which is produced by the process of this invention is a product formed on polymerizing an alkene oxide, a cyclic acid anhydride and a cyclic ether. One method of producing such a terpolymer comprises charging a reactor first with anhydride, then the cyclic ether, then the alkene oxide; adding polymerization catalyst which is an organometallic compound; terminating the polymerization after a desired length of time by the addition of a catalyst inactivating agent, such as isopropyl alcohol; and separating and drying the resulting product by conventional means.

The composition ranges of the monomers in the ABC terpolymer can be conveniently expressed in terms of the molar ratio of two of the monomers to the third monomer. The mole ratio of the alkene oxide to the cyclic acid anhydride ranges from 0.6/1 to 1.4/1, preferably from 0.8/1 to 1.2/1. The mole ratio of the cyclic ether to the cyclic acid anhydride ranges from 0.1/1 to 1/1, preferably from 0.5/1 to 1/1. The monomers of each type can also combine in essentially equimolar ratios in recurring sequence; i.e., 1/1/1.

Although the monomers can be present in the ABC terpolymer in essentially equimolar proportions, the mole ratio of the monomers can be varied and the amount of ABC terpolymer thus obtained is determined in some instances by the monomer present in the least amount. In the preferred method of preparing these ABC terpolymers, an excess amount of cyclic ether monomer is used in the reaction mixture, as the cyclic ether can also serve as a diluent for the reaction mixture.

All of the cyclic ether that is polymerized reacts in such a manner that it forms a terpolymer unit with ABC structure with the alkene oxide and the cyclic acid anhydride. Excess amounts of alkene oxide and cyclic acid anhydride appear in random fashion throughout the terpolymer or, if little or no cyclic ether is present, copolymerize with each other until one of these two monomers is exhausted.

In this ABC terpolymer, at least 10 weight percent of the polymer has this ABC structure, preferably at least 50 weight percent, in order to obtain the advantages of the ABC structure.

Alkene oxides employed in the making of this ABC terpolymer can be saturated, unsaturated, or a mixture thereof. Alkene oxides containing up to and including 20 carbon atoms per molecule can be used in the formation of the terpolymer. Alkene oxides which can be polymerized in accordance with this invention can be represented by the following formula:

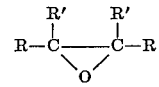

wherein each R and R' is selected from the group consisting of hydrogen, saturated aliphatic, saturated cycloaliphatic, monoolefinic aliphatic, diolefinic aliphatic, monoolefinic cycloaliphatic, diolefinic cycloaliphatic and aromatic radicals, and combinations of these such as aralkyl, alkaryl, and the like. Some or all of the R and R' radicals can also be halogen-substituted, and can contain oxygen in the form of an acyclic ether linkage (—O—) or an oxirane group

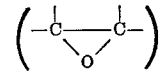

Further, the alkene oxide represented by the above formula can contain one or two olefinic linkages, one or two oxirane groups and up to one acyclic ether linkage. In addition, both R' radicals can represent a divalent aliphatic hydrocarbon radical which, together with the carbon atoms of the oxirane group, can form a cycloaliphatic hydrocarbon nucleus containing from about 4 to about 10 carbon atoms, preferably from about 4 to about 8 carbon atoms.

Specific examples of some of the alkene oxides which are within the above structural formula and which can be homopolymerized or copolymerized in accordance with this invention are ethylene oxide (epoxy ethane); 1,2-epoxypropane (propylene oxide); 1,2-epoxybutane; 2,3-epoxybutane; 2,3-epoxypentane; 2,3-epoxypentane; 1,2-epoxyhexane; 3,4 - epoxyhexane; 1,2 - epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5-epoxyeicosane; 1-chloro-2,3-epoxypropane (epichlorohydrin); 1 - bromo - 2,3-epoxypropane; 1,5 - dichloro - 2,3-epoxypentane; 2-iodo-3,4-epoxybutane; styrene oxide; 6 - oxybicyclo[3.1.0]hexane; 7 - oxybicyclo-[4.1.0]heptane; 3-propyl-7-oxabicyclo[4.1.0]heptane; bis-(2,3-epoxybutyl)ether; tert-butyl 4,5-epoxyhexyl ether; 2-phenylethyl 3,4-epoxybutyl ether and the like.

Unsaturated alkene oxides within the above structural formula, including ethers, which can be homopolymerized or copolymerized in accordance with this invention include allyl 2,3-epoxypropyl ether (allyl glycidyl ether);
allyl 3,4-epoxybutyl ether;
1-methallyl 3,4-epoxyhexyl ether;
3-hexenyl 5,6-epoxyhexyl ether;
2,6-octadienyl 2,3,7,8-diepoxyoctyl ether;
6-phenyl-3-hexenyl 3-ethyl-5,6-epoxyhexyl ether;
3,4-epoxy-1-butene (butadiene monoxide);
3,4-epoxy-1-pentene;
5-phenyl-3,4-epoxy-1-pentene;

1,2,9,10-diepoxy-5-decene;
6,7-di-n-butyl-3,4,9,10-diepoxy-1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)-2,3-epoxypentyl vinyl ether;
bis[4-(3-cyclopentenyl)-2,3-epoxybutyl]ether;
2-(2,4-cyclohexadienyl)ethyl 2,3-epoxybutyl ether;
2-(2,5-cyclohexadienyl)ethyl 2-benzyl-4,5-epoxpentyl ether;
3,4-epoxy-1,5-hexadienyl isopropyl ether;
allyl 3,4-dimethyl-3,4-epoxyhexyl ether;
3,4-epoxy-4-(2,3-dimethylphenyl)-1-butene;
3,4-dimethyl-3,4-epoxy-1-pentene;
5-(4-methylcyclohexyl)-3,4-epoxy-1-pentene;
4,5-diethyl-4,5-epoxy-2,6-octadiene;
4-(2,4-cyclopentadienyl)-1,2,6,7-diepoxyheptane; and
1-phenyl-1,2-epoxy-5,7-octadiene,
and the like.

The second type of monomer contained in the ABC terpolymer is a cyclic acid anhydride (cyclic carboxylic acid anhydride). This monomer can be saturated or unsaturated and can contain substituents such as alkyl, alkenyl, alkoxy, nitro, halo, and the like. Examples of such anhydrides include malonic anhydride, succinic anhydride, glutaric anhydride, adipic anhydride, pimelic anhydride, glutaconic anhydride, maleic anhydride, phthalic anhydride, tetrachlorophthalic anhydride, 3-nitrophthalic anhydride, allylsuccinic anhydride, pyromellitic dianhydride, 1,4,5,6,7,7,-hexachloro-endo-cis-bicyclo[2,2,1]-5-heptene-2,3-dicarboxylic anhydride, endo-cis-bicyclo[2,2,1] - 5-heptene-2,3-dicarboxylic anhydride, and the like. Mixtures of these compounds, saturated, unsaturated or both, can be used.

If either the alkene oxide, the cyclic acid anhydride, or both monomers contains carbon-carbon double bonds, the resulting ABC terpolymer will also contain carbon-carbon double bonds.

The third type of monomer used in preparing the ABC terpolymer is a compound selected from the group comprising cyclic mono- and polyethers (1,3- or 1,4-epoxides). Examples of such ethers are trimethylene oxide (oxetane), bis(chloromethyl)oxetane, tetramethylene oxide (tetrahydrofuran), paraldehyde, and the like.

The organometallic compound used in preparing the ABC terpolymer can be represented by the formula $R'''_n M X_m$ wherein each $R'''$ is a saturated aliphatic, a saturated cycloaliphatic hydrocarbon radical, or a combination thereof containing from 1 to 20 carbon atoms; M is calcium, magnesium, zinc, cadminum, aluminum, gallium, indium, thallium, silicon, or tin; X is hydrogen, fluorine, chlorine, bromine, iodine or $OR'''$; $n$ is an integer from 1 to 4; $m$ is an integer from 0 to 3; and $n$ and $m$ equal the valence of the metal M. An optional cocatalyst can be used with the organometallic compound in preparing the ABC terpolymer. The mole ratio of optional cocatalyst to organometallic compound is in the range of 0.001:1 to 1:1, preferably 0.2:1 to 0.5:1. Specific examples of the optional cocatalysts are water, alcohols, or a complexing agent such as a beta-diketone or a metal salt thereof, such as zinc acetylacetonate.

In the preparation of the ABC terpolymer, there can be numerous variations in the charging procedure. Usually the cyclic acid anhydride is charged first. Then the diluent can be added followed by the remaining monomers, i.e. the cyclic ether and alkene oxide. Finally, the catalyst is added with the organometallic compound generally added before the cocatalyst. The polymerization is conducted in an inert atmosphere such as nitrogen. The diluent employed as a reaction media can be hydrocarbon such as aliphatic, cycloaliphatic, aromatic compounds and mixtures thereof. A liquid monomer or a mixture of liquid monomers, can be used instead of or in admixture with one or more hydrocarbon diluents.

The polymerization is conducted at temperatures ranging from 100° F. to 300° F., preferably from 30° F. to 200° F. The time for polymerization depends upon the temperature and ranges from less than 1 minute to more than 10 days, preferably from 10 minutes to 50 hours. The polymerization reaction can be terminated by any suitable method conventionally used to inactivate organometallic catalyst such as by the addition of an alcohol such as isopropyl alcohol and the terpolymer can be then separated and dried.

The reaction mixture should be maintained substantially completely in the liquid phase and the pressure should be sufficiently high to achieve this result.

ABC terpolymers such as those of tetrahydrofuran, ethylene oxide, and phthalic anhyride prepared according to this invention can be conveniently analyzed by nuclear magnetic resonance (NMR). A regularly repeating unit of this ABC terpolymer can be witten as follows:

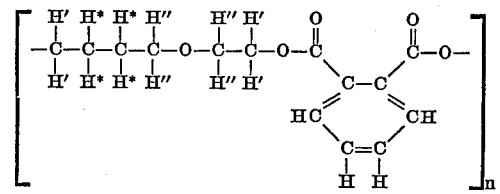

wherein $n$ is the number of repeating units in a polymer molecule and wherein the hydrogen are marked for convenience in identifying those whose chemical environments are alike. It can be seen from the above formula that said repeating unit contains a total of 16 hydrogens and that said 16 hydrogen are equally divided among four different types in terms of chemical environment, i.e., there are four each of the hydrogens H, H', H", and H*. Nuclear magnetic resonance (NMR) analysis of such a 1/1/1 mole ratio terpolymer would then reveal four peaks of equal intensity. Hydrogens of the type H' should show resonance in the region of 5.3–5.9 tau ($\tau$); H* type in the region 8.0–8.7$\tau$; H" type in the region 6.1–6.7$\tau$ and H type (aromatic) in the region 2.1–2.7$\tau$. Such regions are easily resolvable for the required NMR analysis. No other arrangement of the individual monomers in said terpolymer can give rise to this type of NMR spectrum. Furthermore, the relative intensities of the various peaks in the NMR spectra of ABC terpolymers made at mole ratios other than 1/1/1 provide a simple and rapid analysis of the monomer mole ratios in such terpolymers. The amount of (H' and H") in the cyclic ether is equal to the amount of H* in the cyclic ether. Therefore, the intensity ratio of $H/2H^*/(H'+H'')-H^*$ is the same as the monomer ratio of cyclic acid anhydride/cyclic ether/alkene oxide.

The ABC terpolymer can be used as a terminating agent for polymerizations initiated with lithium based initiators. Monomers used in the polymerizations initiated with a lithium based catalyst are polymerizable hydrocarbons such as conjugated dienes or vinyl-substituted aromatic compounds. The conjugated dienes ordinarily contain from 4 to 12 carbon atoms per molecule and those containing from 4 to 8 carbon atoms are preferred. Examples of such compounds include 1 3-butadiene, isoprene, 2,3-dimethyl-1,3-butadiene, piperylene, 3 - butyl-1,3 - octadiene, 2 - phenyl - 1,3 - butadiene and the like. The vinyl-substituted aromatic compounds include styrene, 1-vinylnaphthalene, 2-vinylnaphthalene and the alkyl, cycloalkyl, aryl, alkaryl, and aralkyl derivatives thereof in which the total number of carbon atoms in the combined substituents is generally not greater than 12. Examples of such vinyl-substituted aromatic monomers include 3-methylstyrene, 4-n-propylstyrene, 4-cyclohexylstyrene 4 - dodecylstyrene, 2 - ethyl - 4 - benzylstyrene, 4-(4-phenyl-n-butyl)styrene, and the like. The conjugated dienes and the vinyl-substituted aromatic compounds can be polymerized alone or in admixture to form homopolymers, copolymers or block copolymers. The ABC terpolymer is added to the reaction mixture at the conclusion of the polymerization, but before any material such as water, acid, or alcohol is added to inactivate or remove the lithium atoms present in the polymer.

Reacting ABC polymers with lithium terminated rubbery polymers introduces long chain branching into the polymer and reduces cold flow which in turn improves processing. For example, styrene is polymerized first, then butadiene is polymerized and the unterminated butadiene-styrene copolymer is finally coupled with an ABC polymer. The resulting product is a radial block polymer which has a very high green tensile strength.

The ABC terpolymer can also be used as an adhesive, for example, as a solution (such as 2-10 weight percent) in organic solvent, e.g. The ABC polymer can be applied to substrates such as glass, metal, paper, fabric, leather, wood, rubber plastics and the like. Teflon can be used as a substrate with the ABC terpolymer adhesive of this invention without any prior surface treating step. Normally, Teflon requires a surface treatment step before conventional adhesives can be employed.

Minor amounts of the ABC terpolymer can also be incorporated into polyvinyl chloride, for example in about 2 to 20 weight percent, usually by a dry blend procedure. The resulting composition has higher clarity, better aging stability, higher elongation and higher impact strength than polyvinyl chloride alone.

The advantages of this invention are further illustrated by the following examples. The reactants and the proportions and other specific conditions are presented as being typical and should not be construed to limit the invention.

EXAMPLE I

ABC terpolymers were prepared from epichlorohydrin, phthalic anhydride and tetrahydrofuran. The polymerization catalysts were triisobutyl-aluminum and zinc acetylacetonate. Tetrahydrofuran was used as a polymerization diluent as well as a monomer. A control run was made where toluene was used instead of tetrahydrofuran. All polymerizations were conducted in an atmosphere of nitrogen. The order of the charge was: phthalic anhydride first, followed by tetrahydrofuran or toluene, epichlorohydrin, triisobutyl-aluminum and then finally zinc acetylacetonate. At the conclusion of each polymerization, the reaction mixture was stirred with methyl alcohol to precipitate the polymer. The ABC terpolymer was then separated and dried. The polymerization recipes and results are presented in Table I.

TABLE I

|  | A | B (control) |
|---|---|---|
| Epichlorohydrin, g | 11 | 11 |
| Phthalic anhydride, g | 18 | 18 |
| Tetrahydrofuran, ml | 200 | |
| Toluene | | 200 |
| Triisobutylaluminum, mmoles | 8 | 8 |
| Zinc acetylacetonate, mmoles | 1 | 1 |
| Temperature, °F | 158 | 158 |
| Time, hours | 16 | 16 |
| Wt. of polymer, g | 36 | 27 |
| Theoretical wt. of polymer, g., based 1:1:1 mole ratio of monomer | 37.6 | |

|  | Calculated for 1:1:1 terpolymer | Polymer A, found | Calculated for epichlorohydrin and phthalic anhydride 1:1 copolymer | Polymer B found |
|---|---|---|---|---|
| Analysis, wt. percent: | | | | |
| Cl | 11.5 | 11.0 | 14.8 | 18.9 |
| O | 25.6 | 27.5 | 26.6 | 26.8 |
| C | 57.6 | 56.5 | 54.9 | 51.5 |
| H | 5.4 | 5.5 | 3.7 | 4.0 |
| Description of polymer | (1) | (1) | (2) | (2) |

[1] Tough, tacky, rubbery solid, gel free.
[2] Hard, solid polyester.

A comparison of the weight of the polymer with the theoretical weight based on a 1:1:1 mole ratio of monomers shows that the product contained the monomers in essentially equimolar proportions. Analytical data show that the product of the control Run B is different from the product from Run A.

EXAMPLE II

Runs were conducted in which tetrahydrofuran (THF), epichlorohydrin (ECH) and tetrachlorophthalic anhydride (TCPA) were polymerized employing triisobutylaluminum (TBA) for various polymerization times. Conversion and elemental composition were determined for each of the ABC terpolymers thus obtained. The recipe employed and the results obtained are shown below in Table II.

TABLE II

| Polymerization recipe: | |
|---|---|
| Tetrahydrofuran (THF), ml | 200 |
| Epichlorohydrin (ECH), moles | 0.06 |
| Tetrachlorophthalic anhydride (TCPA), moles | 0.06 |
| Triisobutylaluminum | 6 |
| Temperature, °C | 70 |
| Time, hours | Variable |

| | | | Polymerization results | | | |
|---|---|---|---|---|---|---|
| | | | Polymer composition, wt. percent | | | |
| Run No. | Time, hours | Conv.[a] percent | Cl | O | C | H |
| 1 | 3 | 39 | 38.0 | 18.1 | 41.3 | 3.5 |
| 2 | 5 | 65 | 39.0 | 18.9 | 40.6 | 3.5 |
| 3 | 6.5 | 82 | 41.2 | 18.6 | 40.2 | 3.3 |
| 4 | 16 | 97 | 38.1 | 17.5 | 40.1 | 3.3 |
| | | | [b]39.4 | [b]17.7 | [b]40.0 | [b]2.9 |

[a] Percent conversion calculation based on 100% conversion to a 1/1/1 molar ratio terpolymer.
[b] Theoretical composition calculated for a 1/1/1 molar ratio terpolymer The results for these runs demonstrate that the composition of the polymer is essentially constant throughout the polymerization and further that under the conditions employed, the polymers had a composition that was essentially the same as that calculated for a 1/1/1 terpolymer of tetrahydrofuran, epichlorohydrin and tetrachlorophthalic anhydride. These results taken together indicate that the polymeric products of these runs were not mixtures of homopolymers but were indeed terpolymers of the ABC type having essentially a 1/1/1 molar ratio composition. The results further indicate that said polymers are essentially free of appreciable block sequences of one or more of the three monomers.

EXAMPLE III

Another series of runs were conducted according to the procedure of Example II. The polymerization recipe and results are shown below in Table III.

TABLE III

| Polymerization recipe: | |
|---|---|
| Tetrahydrofuran, ml | 100 |
| Epichlorohydrin, moles | 0.06 |
| 3-nitrophthalic anhydride, moles | 0.06 |
| Triisobutylaluminum (TBA), mmoles | 4 |
| Temperature, °C | 70 |
| Time, hours | Variable |

| POLYMERIZATION RESULTS | | | | | | | |
|---|---|---|---|---|---|---|---|
| | | | Polymer composition, wt. percent | | | | |
| Run No. | Time, hours | Conv.[a] percent | Cl | N | O | C | H |
| 1 | 5 | 30 | 9.7 | 3.8 | 33.5 | 49.2 | 4.4 |
| 2 | 6.5 | 54 | 9.7 | 3.8 | 33.4 | 49.3 | 4.5 |
| 3 | 16 | 88 | 10.2 | 3.6 | 33.8 | 49.7 | 4.9 |
| | | | [b]10.0 | [b]3.9 | [b]31.2 | [b]50.4 | [b]4.5 |

[a] Percent conversion calculation based on 100% conversion to a 1/1/1 molar ratio terpolymer.
[b] Theoretical composition calculated for a 1/1/1 molar ratio terpolymer.

The above results also show an essentially constant composition with increasing conversion and that further this composition is essentially the same as that calculated for a 1/1/1 terpolymer of tetrahydrofuran, epichlorohydrin and 3-nitrophthalic anhydride. These results then have the same significance as those of Example II in terms of the nature of the polymeric products obtained.

EXAMPLE IV

Runs were conducted according to the procedure of Example II for the preparation of terpolymers of tetrahydrofuran, ethylene oxide and phthalic anhydride. The recipe and results are shown below.

TABLE IV

Polymerization recipe:
- Tetrahydrofuran (THF), ml _____ 200
- Ethylene oxide (EO), moles _____ Variable
- Phthalic anhydride (PA), moles _____ Variable
- Triisobutylaluminum (TBA), mmoles _____ 6
- Temperature, °C _____ 70
- Time, hours _____ Variable

POLYMERIZATION RESULTS

| Run No. | Time, hours | Conv.[a] percent | EO, moles | PA, moles | Polymer composition [b] (mole ratio) | | |
|---|---|---|---|---|---|---|---|
| | | | | | THF | EO | PA |
| 1 | 1.5 | 20 | 0.12 | 0.12 | 1.0 | 1.2 | 1.0 |
| 2 | 3.3 | 70 | 0.12 | 0.12 | 1.0 | 1.1 | 1.0 |
| 3 | 2 | 74 | 0.06 | 0.12 | 1.0 | 1.0 | 1.0 |
| 4 | 16 | 88 | 0.06 | 0.12 | 1.0 | 1.0 | 1.0 |
| 5 | 16 | 45 | 0.12 | 0.06 | 1.0 | 1.3 | 1.0 |

[a] Calculation based on 100% conversion to a 1/1/1 terpolymer.
[b] By NMR analysis.

EXAMPLE V

Other runs were carried out in which the amount of tetrahydrofuran was varied while the amount of the other two monomers was held constant. The recipe employed and the results obtained in these runs are shown below in Table V.

TABLE V

Polymerization recipe:
- Toluene, ml _____ 100
- Tetrahydrofuran (THF), moles _____ Variable
- Ethylene oxide (EO), moles _____ 0.06
- Phthalic anhydride (PA), moles _____ 0.06
- Triisobutylaluminum (TBA), moles _____ 4
- Temperature, °C _____ 70
- Time, hours _____ 6

Polymerization results[a]

| Run No. | THF, moles | Polymer composition[b], mole ratio | | |
|---|---|---|---|---|
| | | THF | EO | PA |
| 1 | 0.06 | 0.45 | 1.2 | 1.0 |
| 2 | 0.12 | 0.60 | 1.1 | 1.0 |
| 3 | 0.24 | 0.73 | 1.0 | 1.0 |

[a] Polymer percent conversion was not determined in these runs.
[b] By NMR analysis.

The results of these runs demonstrate the production of terpolymers of varying mole ratios as determined by NMR analysis. If the four peaks are of equal intensity, the monomer mole ratios of the terpolymer is 1/1/1, whereas if the four peaks are of other than equal intensity, analysis of the relative intensities of the various peaks provides the monomer mole ratios of the terpolymer. It is further indicated that it is desirable to use an excess of THF if one wishes to obtain a terpolymer of 1/1/1 mole ratio from the monomers employed in these runs.

EXAMPLE VI

Other runs were conducted in which chlorine content and conversion were employed to characterize the terpolymers of tetrahydrofuran (THF), epichlorohydrin (ECH), and phthalic anhydride (PA). The recipie employed and the results are shown below in Table VI.

TABLE VI

Polymerization recipe:
- Tetrahydrofuran (THF), ml _____ 100
- Epichlorohydrin (ECH), moles _____ Variable
- Phthalic anhydride (PA), moles _____ Variable
- Triisobutylaluminum (TBA), moles _____ 4
- Temperature, °C _____ 70
- Time, hours _____ Variable

POLYMERIZATION RESULTS

| Run No. | ECH, moles | PA, moles | Time, hours | Conv.,[a] percent | Cl[b], wt. percent |
|---|---|---|---|---|---|
| 1 | 0.06 | 0.06 | 16 | 101 | 11.4 |
| 2 | 0.12 | 0.06 | 3 | 60 | 11.4 |
| 3 | 0.12 | 0.06 | 16 | 116 | 11.5 |
| 4 | 0.06 | 0.12 | 3 | 69 | 11.3 |
| 5 | 0.06 | 0.12 | 16 | 91 | 10.3 |

[a] Calculation based on 100% conversion to a 1/1/1 mole ratio terpolymer.
[b] Theoretical value for weight percent chlorine for a 1/1/1 mole ratio terpolymer is 11.5 weight percent.

The polymer of run number 1 is essentially a 1/1/1 mole ratio terpolymer while the polymer of run number 3 is slightly richer in ECH than the polymer of run 1 as shown by the conversion and chlorine content. These runs again demonstrate that terpolymers of varying composition can be prepared according to this invention by varying the mole ratios of the monomers.

EXAMPLE VII

Two ABC terpolymers were prepared according to the process of Example I. Both products were tacky, rubbery solids. The polymerization recipes and results are presented in Table VII.

TABLE VII

| | A | B |
|---|---|---|
| Epichlorohydrin, g | 18.5 | |
| Ethylene oxide, g | | 9.0 |
| Allyl glycidyl ether, g | 4.6 | 4.6 |
| Phthalic anhydride, g | 36.0 | 36.0 |
| Tetrahydrofuran, ml | 400 | 400 |
| Triisobutylaluminum, mmoles | 16 | 16 |
| Temperature, °F | 158 | 158 |
| Time, hours | 16 | 16 |
| Wt. of polymer, g | 68 | 54 |
| Conv. percent based on 1:1:1 mole ratio of monomers[a] | 89 | 81 |

[a] Mixture of alkene oxides considered as one monomer.

EXAMPLE VIII

Two ABC terpolymers were prepared according to the process of Example I. Both products were tacky rubbers. The polymerization recipes and results are presented in Table VIII.

TABLE VIII

| | A | B |
|---|---|---|
| Epichlorohydrin, g | 5.5 | |
| Ethylene oxide, g | | 2.7 |
| Allylsuccinic anhydride, g | 8.4 | 8.4 |
| Tetrahydrofuran, ml | 50 | 50 |
| Triisobutylaluminum, mmoles | 4 | 4 |
| Temperature, °F | 158 | 158 |
| Time, hours | 16 | 16 |
| Wt. of polymer, g | 14.3 | 9.2 |
| Conversion, percent (based on 1:1:1 mole ratio of monomers) | 80 | 60 |

EXAMPLE IX

Three ABC polymers were prepared according to the process of Example I. All products were tacky, rubbery solids. The polymerization recipes and results are presented in Table IX.

TABLE IX

| | A | B | |
|---|---|---|---|
| Epichlorohydrin, moles | 0.6 | 0.6 | 0.6 |
| Endic anhydride, moles | 0.5 | | 0.4 |
| Allylsuccinic anhydride, moles | 0.1 | | |
| Tetrachlorophthalic anhydride, moles | | 0.2 | |
| Chloroendic anhydride [1], moles | | | 0.2 |
| Phthalic anhydride, moles | | 0.4 | |
| Tetrahydrofuran, ml | 1,000 | 1,000 | 1,000 |

[1] 1,4,5,6,7,7-hexachloro-endo-cis-bicyclo[2,2,1]-5-heptene-2,3-dicarboxylic anhydride.

A styrene-butadiene block polymer with a lithium atom attached to the butadiene end of the polymer was prepared and then terminated according to the following procedure.

Step one: Parts by weight
- Styrene _____ 25
- Toluene _____ 860
- n-Butyllithium _____ 3
- Temperature, ° F., 122.
- Time, hours, 1.

Step two: Parts by weight
- Butadiene _____ 75
- Temperature, ° F., 122.
- Time, hours, 2.5.

Step three:
- Terpolymer, terminating agent _____ Variable
- Alcohol coagulation separation drying.

Testing produced the following results:

TESTING RESULTS

| Terminating agent | P.h.m.[a] | Percent conversion | Mooney[b] viscosity MS-4 at 212° F. | Green[c] tensile, p.s.i. | I.V.[d] | H.I.[e] |
|---|---|---|---|---|---|---|
| Polymer: | | | | | | |
| A | 0.3 | 100 | 46.5 | 810 | 0.84 | |
| A | 0.9 | 100 | 46.5 | 830 | 0.84 | 1.91 |
| B | 0.3 | 100 | 56.5 | 840 | 0.92 | |
| B | 0.9 | 100 | 66.5 | 1,430 | 0.97 | 2.1 |
| C | 0.3 | 100 | 60 | 905 | 0.98 | 2.2 |
| C | 0.9 | 100 | 52 | 740 | 0.88 | |
| Isopropyl alcohol[f] (mixture) (control) | 1.0 | 100 | | (g) | 0.63 | 1.38 |

[a] Parts by weight per 100 parts by weight of monomer.
[b] ASTM D 1646-63.
[c] ASTM D 1646-62T.
[d] Inherent viscosity according to the procedure in U.S. 3,278,508, column 20, notes a and b.
[e] Heterogeneity index: $\frac{Mw}{Mn} = \frac{\text{Weight average molecular weight}}{\text{Number average molecular weight}}$
[f] 10 weight percent of 2,2'-methylene-bis(4-methyl-6-tert-butylphenol) in solution with toluene and isopropyl alcohol, 50/50 by volume.
[g] Too low to measure.

The results all indicate that the terminating agent (terpolymer) acted as a coupling agent, i.e., increase in I.V., H.I. and very high increase in green tensile.

Note, the resulting ABC terpolymer in Examples VII, VIII, and IX contain carbon-carbon double bonds as an unsaturated monomer was employed, e.g. allylsuccinic anhydride, or allyl glycidyl ether.

EXAMPLE X

A butadiene block polymer with a lithium atom attached to one end was prepared and terminated according to the following procedure using the terpolymers of Example IX.

Step one: Parts by weight
- Butadiene _____ 100
- Toluene _____ 1100
- n-Butyllithium _____ 1.4
- Temperature, ° F., 122.
- Time, hour, 0.5.

Step two:
- Terpolymer, terminating agent __ Various amounts
- Temperature, ° F., 122.
- Time, hour, 0.5.

The results again indicate that the terpolymer acted as a coupling agent.

EXAMPLE XI

An ABC polymer was prepared according to the process of Example I and the recipe shown below.

Polymerization recipe
- Epichlorohydrin, g. _____ 55
- Phthalic anhydride, g. _____ 90
- Tetrahydrofuran, ml. _____ 1000
- Triisobutylaluminum, mmoles _____ 40
- Temperature, ° F. _____ 70
- Time, hours _____ 7
- Wt. of polymer, g. _____ 162

The polymer formed was compared with a polymer of 2-chloro-1,3-butadiene (Neoprene AC) in an adhesive test and a T-peel strength test at room temperature. The results of these tests are shown in Table XI.

TABLE XI

| Polymer type | Adhesive film thickness, inches | T-peel strength[1] |
|---|---|---|
| Neoprene AC | 0.006 | 7 |
| ABC | 0.008 | 19 |

[1] Pounds per inch width at 24° C.

The tests were conducted by preparing 6 weight percent solutions of the ABC polymer and a 20 weight percent solution of Neoprene AC in toluene. Each solution was painted on a cleaned aluminum surface and the painted surface dried at 70° C. for 4 hours. The aluminum sheets were then single-folded with the painted surfaces contacting each other. The folded sheets were then molded under 10,000 tons of pressure over a surface of 216 square inches for 3 minutes at a temperature of 100° C. The molded sheets were then permitted to stand at 24° C. for 24 hours and then cut into strips of one-inch width. The free edge of each strip was clamped in crosshead jaws of an Instron Tensile Tester machine and pulled apart so that T-peel strength was recorded at a crosshead speed of 12 inches per minute.

TABLE X

| Terminating agent | P.h.m. | Percent conversion | Mooney visc. ML-4 | Cold flow,[a] mg./min. | I.V. | H.I. |
|---|---|---|---|---|---|---|
| Isopropyl alcohol (mixture)[b] (control) | 1.0 | 100 | 11.5 | (c) | 1.62 | 1.24 |
| Polymer: | | | | | | |
| A | 0.15 | 100 | 44.5 | 2.87 | 2.27 | 1.67 |
| A | 0.30 | 100 | 42.0 | 4.16 | 2.25 | |
| B | 0.15 | 100 | 47 | 1.72 | 2.37 | |
| B | 0.30 | 100 | 59.5 | 1.11 | 2.54 | |
| C | 0.15 | 100 | 35 | 5.85 | 2.12 | 1.70 |
| C | 0.30 | 100 | 29.5 | 9.18 | 2.05 | |

[a] Cold flow is measured by extruding the polymer through a ¼-inch orifice at 3.5 p.s.i. pressure at a temperature of 50° C., after allowing 10 minutes to reach steady state, the rate of extrusion is measured and reported in milligrams per minute.
[b] See footnote f of Example IX.
[c] Too high to measure.

EXAMPLE XII

Another ABC polymer was prepared according to the process of Example I and the recipe shown below.

Polymerization recipe

| | |
|---|---|
| Epichlorohydrine, g. | 93 |
| Phthalic anhydride, g. | 148 |
| Tetrahydrofuran, ml. | 1032 |
| Triisobutylalumium, mmoles | 30 |
| Temperature, °F. | 200 |
| Time, hours | 5 |

A blend of polyvinyl chloride (PVC), ABC terepolymer and compounding ingredients was prepared as follows:

| | Parts by weight |
|---|---|
| Polyvinyl chloride | 90 |
| Terpolymer | 10 |
| Advastab T360 [1] | 2 |
| DBTDL [2] | 1 |
| Advawax 140 [3] | 0.5 |
| Advawax 280 [4] | 0.5 |
| Cyan blue (blue pigment) | 0.00047 |

[1] Heat and light stabilizer; organo tin mercapto compound as described in U.S. 3,027,350; sp. gr. 1.45 at 75° F.
[2] Heat and light stabilizer; dibutyl tin dilaurate.
[3] Fatty ester; melting point, 140° F.; saponification No. 160; iodine No. 1; acid No. 2; and free fatty acid, 1%.
[4] N,N'-ethylene-bis(stearamide).

The composition was prepared in a Henschel-type mixer. The polyvinyl chloride was charged and mixed until the temperature reached 160° F. The stabilizers were added and mixing was continued until the temperature reached 210° F. The ABC terpolymer and blue pigment were added and the materials were mixed until the temperature reached 225° F. The Advawaxes were then added and the composition was mixed until the temperature reached 240° F. The composition was then transferred to another mixer and cooled quickly to room temperature. The composition was then transferred to a two-roll mill with a roll temperautre of 350° C. After 10 minutes of warming, the composition was milled for 5 minutes and then sheeted off to 70 ml. thickness. Table XII compares the physical evaluation of the compositon with that of commercial polyvinyl chloride.

TABLE XII

| | Example | Commercial PVC |
|---|---|---|
| Tensile, p.s.i. | 6,757 | 7,000–9,000 |
| Elongation, percent | 21 | 2–4 |
| Notched Izod impact, ft. lbs./in.-notch | 0.79 | 0.40 |

The terpolymer imparted excellent clarity to the polyvinyl chloride and the product was not brittle as is characteristic of polyvinyl chloride.

EXAMPLE XIII

An ABC polymer was prepared according to the process of Example I. The product was found to have excellent solvent resistance, ozone resistance and good tensile strength. The polymerization recipe and results are presented in Table XIII.

TABLE XIII

Polymerization recipe

| | |
|---|---|
| Epichlorohydrin, g. | 385 |
| Endic anhydride, g. | 581 |
| Allylsuccinic anhydride, g. | 98 |
| Tetrahydrofuran | 6265 |
| Triisobutylalumium, mmoles | 175 |
| Temperature, °F. | 93 |
| Time, hours | 6 |
| Wt. of polymer, g. | 1,029 |

The ABC polymer was compared with Hydrin 200 in solvent and ozone resistance tests.

COMPOUNDING RECIPE

| | W | X |
|---|---|---|
| ABC polymer | 100 | |
| Hydrin 200 [a] | | 100 |
| Philblack N550 [b] | 30 | 30 |
| Zinc oxide | 5 | |
| Zinc stearate | | 1 |
| Stearic acid | 1 | |
| TP-70 [c] | 1 | 1 |
| NBC [d] | 1 | 1 |
| Sulfur | 1.75 | |
| Santocure [e] | 1.2 | |
| Red lead | | 5 |
| NA 22 [f] | | 1.5 |

[a] Rubbery copolymer of epichlorohydrin and ethylene oxide (67/33) supplied by B. F. Goodrich Co.
[b] A fast extrusion furnace black.
[c] A processing aid-mold release agent described as an organic compound by Technical Processes, Inc.
[d] Nickel dibutyldithiocarbamate.
[e] N-Cyclohexyl-2-benzothiozolesulfenamide.
[f] 2-Mercaptoimidazoline.

Results (A) Solvent resistance expressed as percent increases in sample volume (percent swell) after immersion in solvent for 7 days at room temperature:

PERCENT SWELL

| Solvent | ABC polymer cured 15 min. at 307° F. | Hydrin 200 cured 30 min. at 307° F. |
|---|---|---|
| ASTM fuel A [a] | 0.68 | 2.14 |
| ASTM fuel C [a] | 26.87 | 47.34 |
| Toluene | 62.80 | 170.18 |
| n-Hexane | 1.14 | 5.02 |
| Acetone | 101.53 | 159.76 |
| Ethyl acetate | 105.11 | 182.01 |
| Trichloroethylene | 113.79 | 190.22 |
| Ethanol | 9.76 | 16.60 |

[a] ASTM D439–60T.

(B) Ozone resistance expressed by visual rating of samples exposed for 13 days to 25 parts per hundred million of ozone in a static bent loop test (rating is 0–10 with 0 being best):

Ozone resistance rating

| | Rating |
|---|---|
| ABC polymer cured 15 min. at 307° F. | 0 |
| Hydrin 200 cured 30 min. at 307° F. | 0 |

(C) Tensile strength ASTM D–412–62T:

| | Tensile, p.s.i. |
|---|---|
| ABC polymer cured 20 min. at 307° F. | 1300 |
| Hydrin 200 cured 30 min. at 307° F. | 1630 |

The results above show the ABC polymer to have excellent solvent resistance, ozone resistance and good tensile strength. These properties are furthermore as good or better than those shown by Hydrin 200 which is considered to be one of the best polymers available for solvent and ozone resistance.

Although this invention has been described in considerable detail, it must be understood that such detail is for the purposes of illustration only and that many variations and modifications can be made by one skilled in the art without departing from the scope and spirit thereof.

I claim:

1. A method for the production of an ABC terpolymer containing three different monomers in an essentially recurring sequence in at least 10 weight percent of said ABC terpolymer comprising: reacting under polymerization conditions a monomer mixture wherein said three different monomers consist essentially of (I) an oxirane

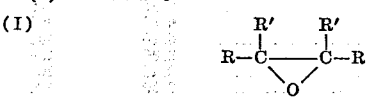

containing up to 20 carbon atoms wherein each R and R' is selected from the group consisting of hydrogen; saturated aliphatic, saturated cycloaliphatic, monoolefinic aliphatic, diolefinic, aliphatic, monoolefinic cycloaliphatic, diolefinic cycloaliphatic, aromatic radicals, and combinations thereof; halogen-substituted members thereof; and memembers thereof containing oxygen in the form of an acylic ether linkage (—O—), a further oxirane group

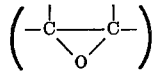

or wherein both R' substituents taken together form a divalent aliphatic hydrocarbon radical bound to the carbon atoms of the oxirane group to form a cycloaliphatic nucleus containing from 4 to 10 carbon atoms, (II) a cyclic acid anhydride containing up to 20 carbon atoms per molecule, and (III) a 1,3-epoxide or 1,4-epoxide, in the presence of a catalyst system selected from the group consisting of an organometallic compound $R_n'''MX_m$ and said $R_o'''MX_m$ with from 0.001:1 to 1:1 mole ratio of a cocatalyst to said $R_n'''MX_m$, wherein each $R'''$ is a saturated aliphatic, a saturated cycloaliphatic, an aromatic hydrocarbon radical, or a combination thereof, containing from 1 to 20 carbon atoms; M is calcium, magnesium, zinc, cadmium, aluminum, gallium, indium, thallium, silicon or tin; X is hydrogen, fluorine, chlorine, bromine, iodine or $OR'''$; $n$ is an integer from 1 to 4; $m$ is an integer from 0 to 3; and $n$ and $m$ equal the valence of the metal M, wherein in said ABC terpolymer the mole ratio of said oxirane to said cyclic acid anhydride ranges from 0.6/1 to 1.4/1, and the mole ratio of said 1,3-epoxide or 1,4-epoxide to said cyclic acid anhydride ranges from 0.1/1 to 1/1.

2. The method of claim 1 wherein in said terpolymer the mole ratio of said oxirane to said cyclic acid anhydride ranges from 0.8/1 to 1.2/1 and the mole ratio of said 1,3-epoxide or 1,4-epoxide to said cyclic acid anhydride ranges from 0.5/1 to 1/1.

3. The method of claim 1 wherein each of said monomers in said terpolymer is present in essentially equimolar proportions in at least 50 weight percent of said terpolymer.

4. The method of claim 1 wherein each of said monomer in said terpolymer is present in essentially equimolar proportions.

5. The method of claim 1 wherein an excess amount of said 1,3-epoxide or 1,4-epoxide is present in said mixture.

6. The method of claim 1 wherein said cyclic acid anhydride is malonic anhydride, succinic anhydride, glutanic anhydride, adipic anhydride, pimelic anhydride, glutacomic anhydride, maleic anhydride, phthalic anhydride, tetrachlorophthalic anhydride, 3-nitrophthalic anhydride, allylsuccinic anhydride, pyromellitic dianhydride, chloroendic anhydride, endic anhydride, or a mixture of two or more thereof.

7. The method of claim 1 wherein said 1,3-epoxide or 1,4-epoxide is a mono- or poly-1,3-epoxide or 1,4-epoxide, trimethylene oxide (oxetane), bis(chloromethyl)oxetane, tetramethylene oxide (tetrahydrofuran), or paraldehyde.

8. The method of claim 1 wherein said reaction is carried out at a temperature ranging from —100° F. to 300° F., for a time ranging from 1 minute to more than 10 days and at a pressure sufficient to maintain the reaction mixture in the liquid phase.

9. The method of claim 1 wherein said organometallic compound is triisobutylaluminum.

10. The method of claim 1 wherein said oxirane is epichlorohydrin or ethylene oxide; said cyclic acid anhydride is phthalic anhydride, tetrachlorophthalic anhydride, 3-nitrophthalic anhydride, allylsuccinic anhydride, chloroendic anhydride or endic anhydride; and said 1,3-epoxide or 1,4-epoxide is tetrahydrofuran.

11. An ABC terpolymer containing three different monomers in an essentially recurring sequence in at least 10 weight percent of said ABC terpolymer, wherein said three different monomers consist essentially of:

(I) an oxirane

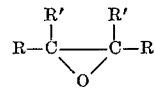

containing up to 20 carbon atoms wherein each R and R' is selected from the group consisting of hydrogen, saturated aliphatic, saturated cycloaliphatic, monoolefinic aliphatic, diolefinic aliphatic, monoolefinic cycloaliphatic, diolefinic cycloaliphatic, aromatic radicals, and combinations thereof; halogen-substituted members thereof; and members thereof concontaining oxygen in the form of an acyclic ether linkage (—O—), an oxirane group

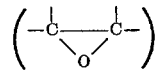

or wherein both R' substituents taken together form a divalent aliphatic hydrocarbon radical bound to the carbon atoms of the oxirane group to form a cycloaliphatic nucleus containing from 4 to 10 carbon atoms, (II) a cyclic acid anhydride containing up to 20 carbon atoms per molecule, and (III) a 1,3-epoxide or 1,4-epoxide, wherein in said ABC terpolymer the mole ratio of said oxirane to said cyclic acid anhydride ranges from 0.6/1 to 1.4/1, and the mole ratio of said 1,3-epoxide or 1,4-epoxide to said cyclic acid anhydride ranges from 0.1/1 to 1/1.

12. The terpolymer of claim 11 wherein in said terpolymer the mole ratio of said oxirane to said cyclic acid anhydride ranges from 0.8/1 to 1.2/1 and the mole ratio of said 1,3-epoxide or 1,4-epoxide to said cyclic acid anhydride ranges from 0.5/1 to 1/1.

13. The terpolymer of claim 11 wherein each of said monomers in said terpolymer is present in essentially equimolar proportions in at least 50 weight percent of said terpolymer.

14. The terpolymer of claim 11 wherein each of said monomers in said terpolymer is present in essentially equimolar proportions.

15. The terpolymer of claim 11 wherein said oxirane is epichlorohydrin or ethylene oxide; said cyclic acid anhydride is phthalic anhydride, tetrachlorophthalic anhydride, 3-nitrophthalic anhydride, allylsuccinic anhydride, chloroendic anhydride or endic anhydride; and said 1,3-epoxide or 1,4-epoxide is tetrahydrofuran.

16. The terpolymer of claim 11 wherein said terpolymer contains carbon-carbon double bonds.

References Cited
UNITED STATES PATENTS

| | | | |
|---|---|---|---|
| 3,337,511 | 8/1967 | Matsuura et al. | 260—78.4 |
| 3,378,527 | 4/1968 | Case et al. | 260—67 |
| 3,382,217 | 5/1968 | Case | 260—78.4 |
| 3,464,958 | 9/1969 | Matsuura et al. | 260—78.4 |

JOSEPH L. SCHOFER, Primary Examiner

J. KIGHT III, Assistant Examiner

U.S. Cl. X.R.

260—2

UNITED STATES PATENT OFFICE

CERTIFICATE OF CORRECTION

Patent No. 3,661,865      Henry L. Hsieh      Dated: May 9, 1972

It is certified that error appears in the above-identified patent and that said Letters Patent are hereby corrected as shown below:

Column 13, line 1, after "diolefinic" delete the comma;

Column 13, line 4, for "memembers" read -- members --;

Column 13, line 21, for "$R_o''`MX_m$" read -- $R_n''`MX_m$ --; and

Column 13, lines 45, 46, for "monomer" read -- monomers --.

Signed and sealed this 28th day of November 1972.

(SEAL)
Attest:

EDWARD M. FLETCHER, JR.            ROBERT GOTTSCHALK
Attesting Officer                    Commissioner of Patents